(12) United States Patent
Kaneda et al.

(10) Patent No.: US 11,286,972 B2
(45) Date of Patent: Mar. 29, 2022

(54) FASTENING MEMBER

(71) Applicant: NHK Spring Co., Ltd., Yokohama (JP)

(72) Inventors: Noriyoshi Kaneda, Kanagawa (JP); Takeshi Suzuki, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 271 days.

(21) Appl. No.: 16/495,466

(22) PCT Filed: Mar. 2, 2018

(86) PCT No.: PCT/JP2018/008161
§ 371 (c)(1),
(2) Date: Sep. 19, 2019

(87) PCT Pub. No.: WO2018/173705
PCT Pub. Date: Sep. 27, 2018

(65) Prior Publication Data
US 2020/0072272 A1    Mar. 5, 2020

(30) Foreign Application Priority Data
Mar. 24, 2017   (JP) .............................. JP2017-058387

(51) Int. Cl.
*F16B 33/02*  (2006.01)
*F16B 35/04*  (2006.01)
(Continued)

(52) U.S. Cl.
CPC .............. *F16B 33/02* (2013.01); *F16B 33/06* (2013.01); *F16B 35/04* (2013.01); *C22C 21/00* (2013.01)

(58) Field of Classification Search
CPC .......... F16B 33/02; F16B 33/06; F16B 35/00; F16B 35/04; F16B 37/00; F16B 39/22; F16B 39/30; C22C 21/00
(Continued)

(56) References Cited

U.S. PATENT DOCUMENTS 3,579,684 A    5/1971   Dufffy
4,023,224 A *  5/1977   Frailly ..................... B23G 9/00
                                                  470/17
(Continued)

FOREIGN PATENT DOCUMENTS

CN          1161550 C       8/2004
CN          103967908 A     8/2014
(Continued)

OTHER PUBLICATIONS

Supplementary European Search Report dated Oct. 26, 2020, issued for the European patent application No. 18772409.1.
(Continued)

*Primary Examiner* — Roberta S Delisle
(74) *Attorney, Agent, or Firm* — Locke Lord LLP

(57) ABSTRACT

A fastening member includes a screw thread formed therein. A portion including a crest portion of the screw thread is formed of a first alloy material and includes: a thick portion where the portion is maximized in thickness in a circumferential direction; and a thin portion where the portion is minimized in thickness in the circumferential direction. A portion including a root of the screw thread is formed of a second alloy material having a tensile strength higher than that of the first alloy material.

5 Claims, 6 Drawing Sheets

(51) Int. Cl.
*F16B 33/06* (2006.01)
*C22C 21/00* (2006.01)

(58) Field of Classification Search
USPC .................. 411/411, 436, 900, 901, 914
See application file for complete search history.

(56) References Cited

U.S. PATENT DOCUMENTS

| | | | |
|---|---|---|---|
| 4,033,393 A | 7/1977 | Bedi | |
| 4,863,330 A * | 9/1989 | Olez | B29C 70/081 411/424 |
| 5,122,020 A * | 6/1992 | Bedi | F16B 39/28 411/302 |
| 5,381,606 A * | 1/1995 | Solimar | B65D 88/706 34/582 |
| 5,382,318 A * | 1/1995 | Tahara | C21D 9/0093 216/100 |
| 5,419,948 A * | 5/1995 | Yoshino | C21D 9/0093 411/411 |
| 5,484,244 A * | 1/1996 | Glovan | F16B 1/0014 29/447 |
| 7,014,409 B2 * | 3/2006 | Allaart | F16B 15/0092 411/440 |
| 7,195,437 B2 * | 3/2007 | Sakamoto | F16B 33/06 411/82.3 |
| 7,824,142 B2 * | 11/2010 | Felder | C23C 26/00 411/424 |
| 7,938,609 B2 * | 5/2011 | Mori | F16B 25/0021 411/386 |
| 7,950,885 B2 * | 5/2011 | Rosenkranz | F16B 33/004 411/82.2 |
| 2004/0127297 A1 | 7/2004 | Majumdar et al. | |
| 2019/0003507 A1 | 1/2019 | Kazama et al. | |

FOREIGN PATENT DOCUMENTS

| | | |
|---|---|---|
| FR | 776728 A | 1/1935 |
| JP | 50-124044 A | 9/1975 |
| JP | H11-210728 A | 8/1999 |
| WO | 2017/038726 A1 | 3/2017 |

OTHER PUBLICATIONS

Office Action dated Jul. 31, 2020, issued for the corresponding Chinese patent application No. 201880019289.8 with an English translation of the cover page and the search report.
International Search Report dated May 15, 2018, issued for PCT/JP2018/008161.

* cited by examiner

FASTENING MEMBER

The present disclosure relates to fastening members.

BACKGROUND

Reduction in weight of fastening members, such as bolts and screws, as well as fastening structures with these fastening members has conventionally been attempted from various points of view, due to a demand for reduction in weight of components in the industrial field in general. Improvement in reliability and durability of the fastening members needs to be undertaken also, and the reduction in weight and the improvement in reliability and durability are both becoming necessary.

With respect to the above described problems, a technique where a material combined of two types of alloys by cladding or the like is applied to bolts is becoming widespread. For example, a bolt having a base material formed of aluminum is described in Patent Literature 1, the base material having a surface covered by nickel.

CITATION LIST

Patent Literature

Patent Literature 1: Japanese Laid-open Patent Publication No. 11-210728

SUMMARY

Technical Problem

However, bolts, which are formed of a material combined of two types of alloys, such as a cladding material including aluminum, often still have problems remaining in their reliability and durability as fastening structures even if these bolts are able to be reduced in weight. That is, as these bolts are repeatedly used, loosening may occur.

In view of the above, an object of the present invention is to: realize reduction in weight of fastening members; reduce occurrence of loosening; and improve reliability and durability of fastening structures of the fastening members.

Solution to Problem

To solve the above-described problem, a fastening member according to the present invention includes a screw thread formed therein, wherein a portion including a crest portion of the screw thread is formed of a first alloy material and includes: a thick portion where the portion is maximized in thickness in a circumferential direction; and a thin portion where the portion is minimized in thickness in the circumferential direction, and a portion including a root of the screw thread is formed of a second alloy material having a tensile strength higher than that of the first alloy material.

Moreover, according to another fastening member according to the present invention includes: a head portion; and a shaft portion including a screw thread formed therein, wherein the shaft portion includes a main body portion, and an outer peripheral portion provided radially outside the main body portion, the outer peripheral portion in the screw thread is formed of a first alloy material, and forms a portion including at least a crest portion of the screw thread, the main body portion in the screw thread is formed of a second alloy material having a tensile strength higher than that of the first alloy material, and forms a portion including a root of the screw thread, and the outer peripheral portion in the screw thread includes: a thick portion where the outer peripheral portion is maximized in thickness in a circumferential direction of the shaft portion; and a thin portion where the outer peripheral portion is minimized in thickness in the circumferential direction of the shaft portion.

In the other fastening member according to the present invention, the thick portion and the thin portion are formed by the outer peripheral portion being eccentric with respect to the main body portion.

In the other fastening member according to the present invention, the thick portion and the thin portion are opposite to each other across a central axis of the shaft portion.

In the other fastening member according to the present invention, one or more of the screw threads are formed in a screw portion formed in an axial direction intermediate portion of the shaft portion, the screw thread extends one round about an axis of the shaft portion, and the thick portion and the thin portion are formed at least one each in the one round of the screw thread in the screw portion.

In the other fastening member according to the present invention, the first alloy material is a 1000 series or 6000 series aluminum-based alloy according to the Japanese Industrial Standards, and the second alloy material is a 2000 series or 7000 series aluminum-based alloy according to the Japanese Industrial Standards.

Another fastening member according to the present invention includes: a screw thread formed therein; a main body portion; and an inner peripheral portion provided radially inside the main body portion, wherein the inner peripheral portion in the screw thread is formed of a first alloy material, and forms a portion including at least a crest portion of the screw thread, the main body portion in the screw thread is formed of a second alloy material having a tensile strength higher than that of the first alloy material, and forms a part including a root of the screw thread, and the inner peripheral portion in the screw thread includes: a thick portion where the inner peripheral portion is maximized in thickness in a circumferential direction; and a thin portion where the inner peripheral portion is minimized in thickness in the circumferential direction.

Advantageous Effects of Invention

According to the present invention, a fastening member having excellent reliability and durability is able to be provided, while reduction in weight of the fastening member is realized.

DESCRIPTION OF EMBODIMENTS

Hereinafter, embodiments of the present invention will be described while reference is made to the drawings.

First Embodiment

Figure 1:
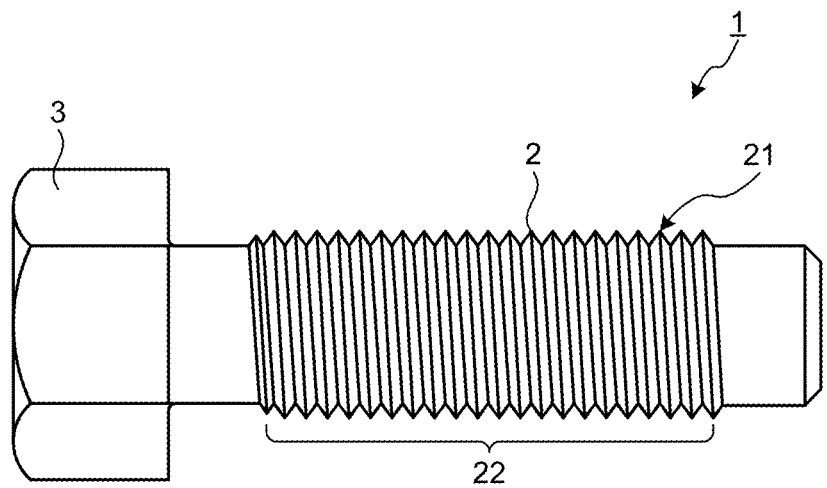
FIG. 1 is a side view illustrating a configuration of a fastening member according to a first embodiment of the present invention.

FIG. 1 is a side view illustrating a fastening member 1 according to a first embodiment of the present invention. The fastening member 1 is a bolt (one type of male screws) having a head portion 3 forming a hexagonal shape; and a shaft portion 2 forming a rod shape. The shaft portion 2 is provided with a screw portion 22 formed with plural screw threads 21 in an axial direction (extending direction) intermediate portion of the shaft portion 2. Ends of each of the screw threads 21 are shifted from each other in an axial direction, and each of the screw threads 21 extends one round about an axis of the shaft portion 2. In the screw threads 21, axially adjacent ones of the screw threads 21 are connected to each other. The plural screw threads 21 in the screw portion 22 extend spirally. The shape of the head portion 3 is not limited to the hexagonal shape, and may be any other shape, such as a dish shape or a flat shape.

Figure 2:
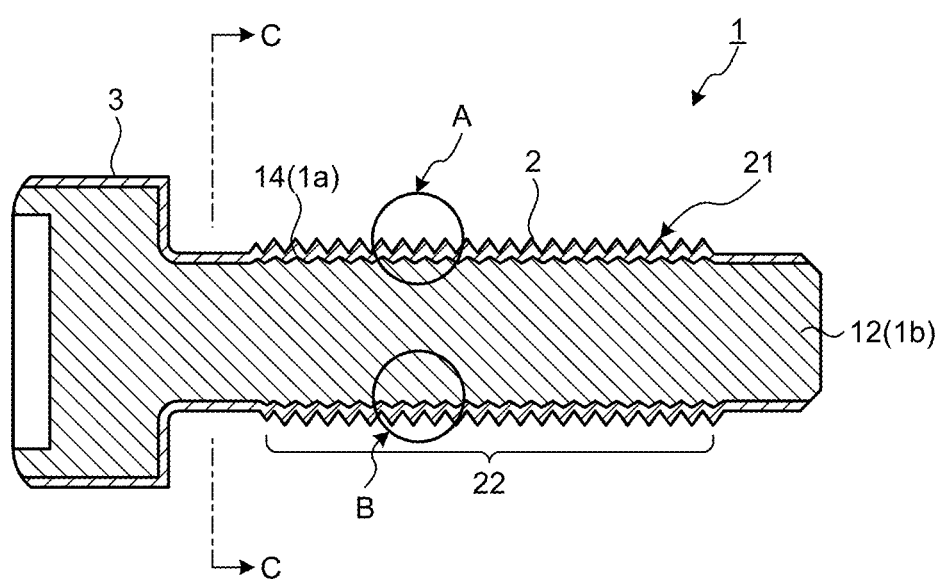
FIG. 2 is a sectional view including a central axis of the fastening member illustrated in FIG. 1.

FIG. 2 is a sectional view including a central axis in the axial direction of the shaft portion 2 of the fastening member 1. The shaft portion 2 has: a main body portion 12 that is an inner peripheral part of the shaft portion 2; and an outer peripheral portion 14 forming an outer peripheral part (radially outside the main body portion 12) of the shaft portion 2. The outer peripheral portion 14 and the main body portion 12 are respectively formed of a first alloy material 1*a* and a second alloy material 1*b* that are two types of alloys different from each other. The first alloy material 1*a* forms the outer peripheral portion 14 radially outside the main body portion 12. The second alloy material 1*b* forms the main body portion 12 that is the inner peripheral part of the shaft portion 2. Since the second alloy material 1*b* forms the main body portion 12, the second alloy material 1*b* is a material that is higher in strength, in particular, higher in tensile strength, than the first alloy material 1*a* forming the outer peripheral portion 14.

A cladding material of the first alloy material 1*a* and second alloy material 1*b* may be used as a material for the shaft portion 2.

Two types of alloys having the same element as their main component may be used as the first alloy material 1*a* and second alloy material 1*b*. For example, two types of aluminum-based alloys may be used.

A 1000 series or 6000 series aluminum-based alloy may be used as the first alloy material 1*a*. For example, A6063 according to the Japanese Industrial Standards may be used as the first alloy material 1*a*. A6056 according to the Japanese Industrial Standards may also be used. These aluminum-based alloys are alloys that are comparatively high in strength, have excellent corrosion resistance and excellent stress corrosion resistance, and are comparatively light in weight.

A 2000 series or 7000 series aluminum-based alloy may be used as the second alloy material 1*b*. For example, A2618 or A2024 according to the Japanese Industrial Standards may be used as the second alloy material 1*b*. These alloys are aluminum-based alloys that have comparatively high tensile strength and are comparatively light in weight and high in strength. In particular, they have higher tensile strength than the aluminum-based alloy serving as the first alloy material 1*a*.

Two types of alloys having different elements as their main components may be used as the first alloy material 1*a* and second alloy material 1*b*.

The main body portion 12 exists at an inner peripheral side of the shaft portion 2, and an outer peripheral part thereof is covered by the outer peripheral portion 14. The outer peripheral portion 14 does not need to completely cover the main body portion 12, and as illustrated in FIG. 2, for example, a part of the head portion 3, or an end portion of the shaft portion 2 may be exposed, the end portion being at an end opposite to an end where the head portion 3 is.

Figure 3:
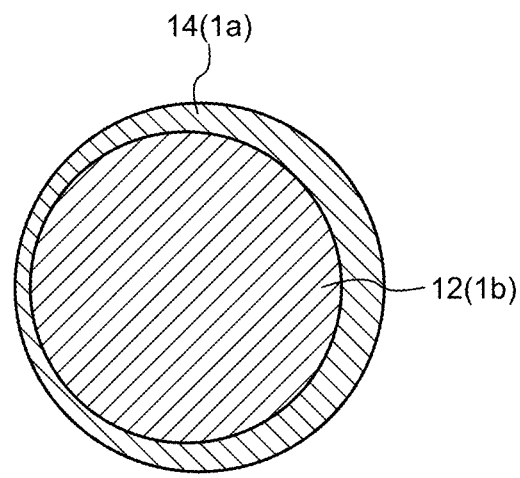
FIG. 3 is a schematic diagram of a C-C cross section of the fastening member illustrated in FIG. 1.

FIG. 3 is a schematic diagram of a C-C cross section of the fastening member 1 (a sectional view as viewed along a central axis direction in the shaft portion 2). As illustrated in FIG. 3, the outer peripheral portion 14 differs in thickness at positions of the shaft portion 2 along a circumferential direction. The outer peripheral portion 14 has: a maximum thickness portion; and a minimum thickness portion in a region opposite thereto with respect to the central axis of the shaft portion 2 (a portion opposite thereto by about 180 degrees). That is, the outer peripheral portion 14 forms a portion externally peripheral to the main body portion 12 in a state of being eccentric radially outward with respect to the main body portion 12.

The outer peripheral portion 14 being eccentric with respect to the main body portion 12 means that: a virtual central axis of the outer peripheral portion 14 and likewise a virtual central axis of the main body portion 12 are positionally shifted from each other in a sectional view along the central axis direction of the shaft portion 2, and do not coincide with each other.

Figure 4:
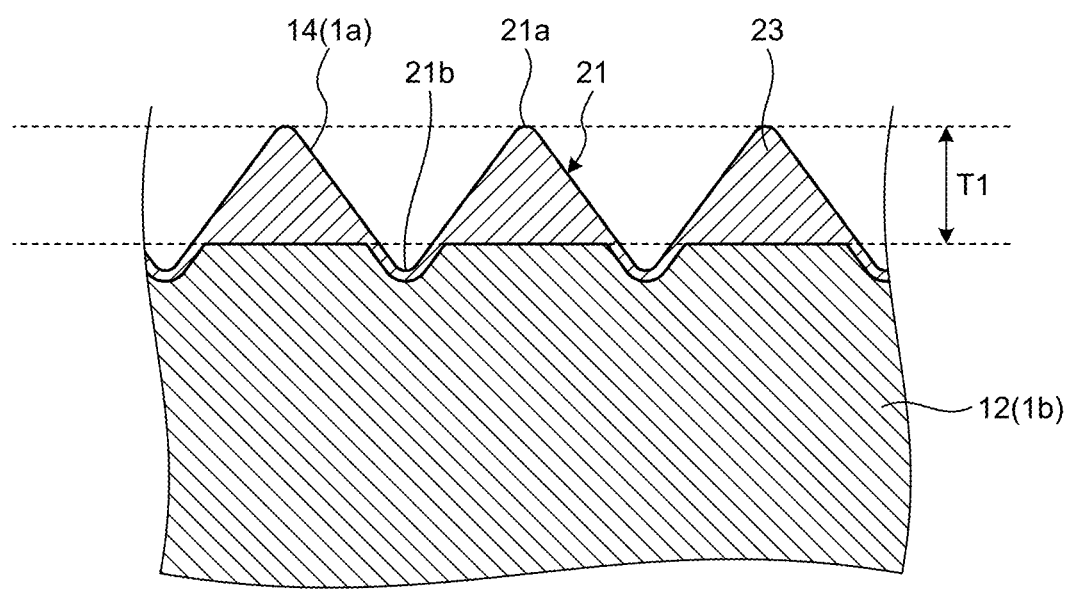
FIG. 4 is an enlarged view of a region A in FIG. 2.

FIG. 4 is an enlarged view of a region A (the maximum thickness portion) in FIG. 2. As illustrated in FIG. 4, at least crest portions 21*a* of the screw threads 21 in the screw portion 22 are formed of the outer peripheral portion 14. That is, the crest portions 21*a* of the screw threads 21 are formed of the first alloy material 1*a*. A thickness of the first alloy material 1*a* in the maximum thickness portion is a maximum thickness T1 at least in the screw threads 21 including their crest portions 21*a*.

The screw threads 21 are formed of the main body portion 12, at a root side thereof. That is, the screw threads 21 are formed of the second alloy material 1*b*, at the root side. Root portions 21*b* of the screw portion 22 are thinly covered by the outer peripheral portion 14, and the main body portion 12 is not exposed thereat. That is, the root portions 21*b* are formed of the first alloy material 1*a* that is the outer peripheral portion 14.

Figure 5:
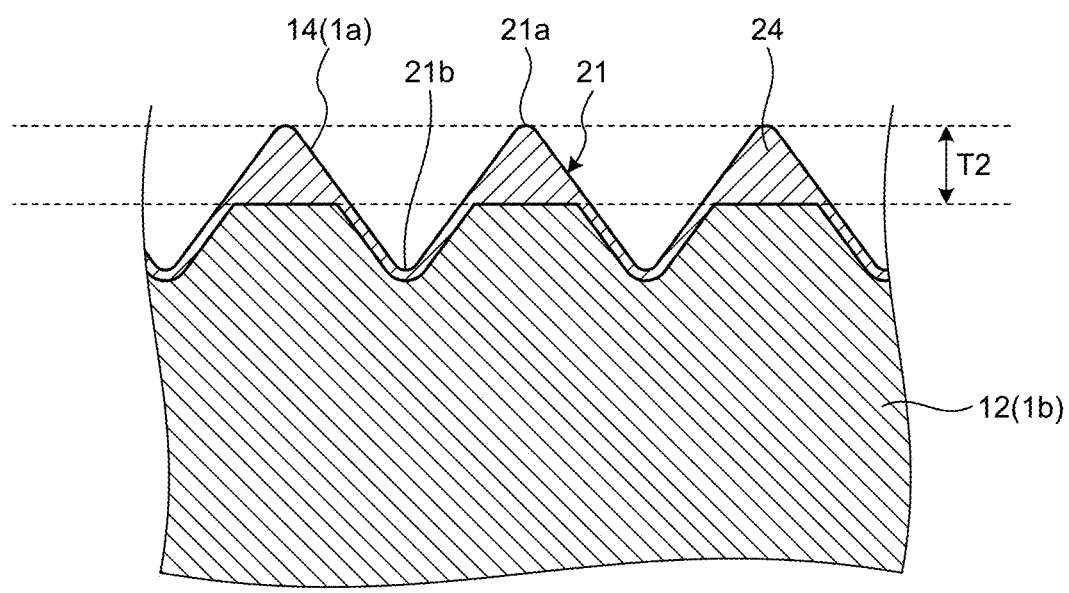
FIG. 5 is an enlarged view of a region B in FIG. 2.

FIG. 5 is an enlarged view of a region B (the minimum thickness portion) in FIG. 2. In the same screw threads 21, the minimum thickness portion is formed opposite to the maximum thickness portion (in a portion opposite thereto by about 180 degrees) across the central axis of the shaft portion 2. As illustrated in FIG. 5, at least crest portions 21*a* of the screw threads 21 in the minimum thickness portion are formed of the outer peripheral portion 14. That is, the crest portions 21a of the screw threads 21 in this portion are formed of the first alloy material 1a. A thickness of the first alloy material 1a in the minimum thickness portion is a minimum thickness T2 (<T1) at least in the screw threads 21 including their crest portions 21a.

The screw threads 21 are formed of the main body portion 12, at a root side thereof. That is, the screw threads 21 are formed of the second alloy material 1b, at the root side. The root portions 21b of the screw portion 22 are thinly covered by the outer peripheral portion 14, and the main body portion 12 is not exposed thereat. That is, the root portions 21b are formed of the first alloy material 1a that is the outer peripheral portion 14.

As described above, in the screw portion 22 of the fastening member 1, the outer peripheral portion 14 formed of the first alloy material 1a has, in a single screw thread 21, the maximum thickness T1 and the minimum thickness T2. That is, the outer peripheral portion 14 formed of the first alloy material 1a has, in a single screw thread 21: a thick portion 23 that is eccentric radially outward with respect to the main body portion 12; and a thin portion 24.

The maximum thickness portion (the thick portion 23) and the minimum thickness portion (the thin portion 24) that the outer peripheral portion 14 has are each not limited to a single location, and may each be plurally provided in a single screw thread 21. Furthermore, both the maximum thickness portion (the thick portion 23) and the minimum thickness portion (the thin portion 24) that the outer peripheral portion 14 has do not need to be provided in all of the screw threads 21 in the screw portion 22, and may be provided only in a part of the screw threads 21. Moreover, both the maximum thickness portion (the thick portion 23) and the minimum thickness portion (the thin portion 24) that the outer peripheral portion 14 has may be configured to be not present opposite to each other by 180°.

Described below are functions and effects of the above described fastening member 1 according to the first embodiment of the present invention. When the fastening member 1 is fastened to a counterpart member, the screw threads 21 of the screw portion 22 are engaged with and fastened to the counterpart member. The thick portion 23 has a larger portion made of the first alloy material 1a than the remaining outer peripheral portion has, and on the other hand, the thin portion 24 has a smaller portion made of the first alloy material 1a than the remaining outer peripheral portion. That is, in the thick portion 23 and the thin portion 24, the two types of materials having different strengths are present in different component ratios. As a result, axial load (withstanding load) in the thick portion 23 and the thin portion 24 is not uniform in distribution and inclined load is thus exerted on the central axis of the shaft portion 2 in this configuration, and thus the fastening member 1 is firmly engaged with the counterpart member and loosening is able to be effectively prevented.

Furthermore, because the shaft portion 2 of the fastening member 1 has the outer peripheral portion 14 formed of the first alloy material 1a, and the main body portion 12 formed of the second alloy material 1b; materials used as the whole fastening member are able to be optimized according to strength and properties that are needed, and weight reduction is able to be realized.

Furthermore, since the thick portion 23 and the thin portion 24 are formed, with the outer peripheral portion 14 being formed eccentrically with respect to the central axis of the shaft portion 2; the fastening member 1 is able to be manufactured more easily.

Furthermore, because the thick portion 23 and the thin portion 24 are positioned in regions opposite to each other about the central axis of the shaft portion 2 (in portions opposite to each other by about 180 degrees), inclined load on the central axis is able to be generated effectively, and firmer fastening is able to be realized.

Furthermore, since the 1000 series or 6000 series aluminum-based alloy serving as the first alloy material 1a forming the outer peripheral portion 14 has excellent corrosion resistance and stress corrosion resistance; by this material covering the shaft portion 2 including the screw threads 21, in particular, reliability of the fastening member is able to be increased. Moreover, since the aluminum-based alloy is comparatively light in weight, the weight of the fastening member 1 is able to be reduced.

Described below are specific examples of a configuration of the above described fastening member 1. A first example, a second example, and a conventional example all described below were manufactured as specific configuration examples.

FIRST EXAMPLE

The fastening member 1 (bolt) according to this example was manufactured by: forming the screw portion 22 through a rolling process after a header process and a heat treatment process both on a rod-shaped cladding material formed by using A2618 according to the Japanese Industrial Standards in the main body portion 12 of the shaft portion 2 and covering the outer peripheral part of the main body portion 12 with A6063 according to the Japanese Industrial Standards. Its bolts size was M8×50.

Figure 6:
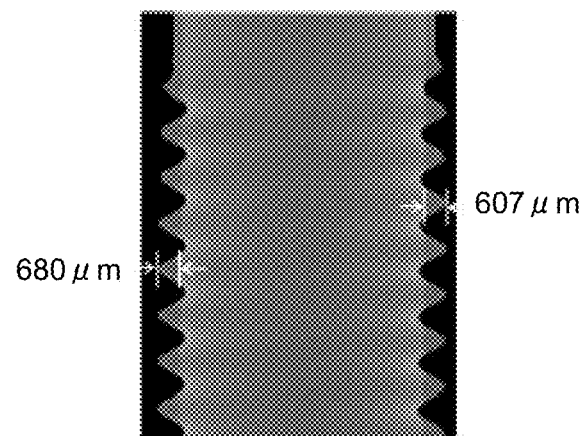
FIG. 6 is an X-ray CT scan photograph of a cross section including a central axis of a bolt according to a first example.

FIG. 6 is an X-ray CT scan photograph of a cross section including the central axis of the bolt according to the first example. A thickness of a part of the outer peripheral portion 14 formed of A6063 according to the Japanese Industrial Standards in the screw threads 21 was 607 microns, and a thickness of the outer peripheral portion 14 opposite thereto across the central axis was 680 microns.

SECOND EXAMPLE

The fastening member 1 (bolt) according to this example was manufactured similarly to that according to the first example, except that the thickness of the outer peripheral portion of the cladding material was changed.

Figure 7:
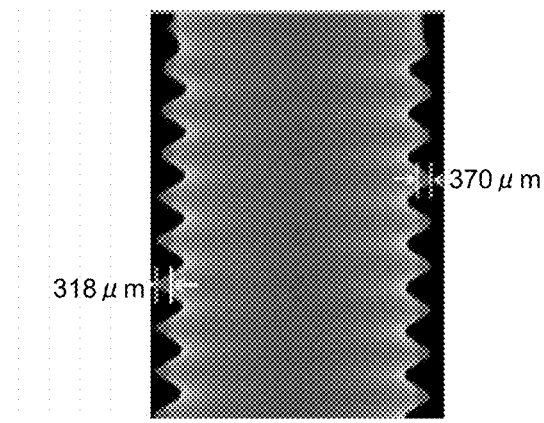
FIG. 7 is an X-ray CT scan photograph of a cross section including a central axis of a bolt according to a second example.

FIG. 7 is an X-ray CT scan photograph of a cross section including the central axis of the bolt according to the second example. A thickness of a part of the outer peripheral portion 14 formed of A6063 in the screw threads 21 was 370 microns, and a thickness of the outer peripheral portion 14 opposite thereto across the central axis was 318 microns.

CONVENTIONAL EXAMPLE

A fastening member (bolt) according to the conventional example was manufactured similarly to that according to the first example, except that only an A2618 material according to the Japanese Industrial Standards was used in formation of the shaft portion 2 and head portion 3.

Figure 8:
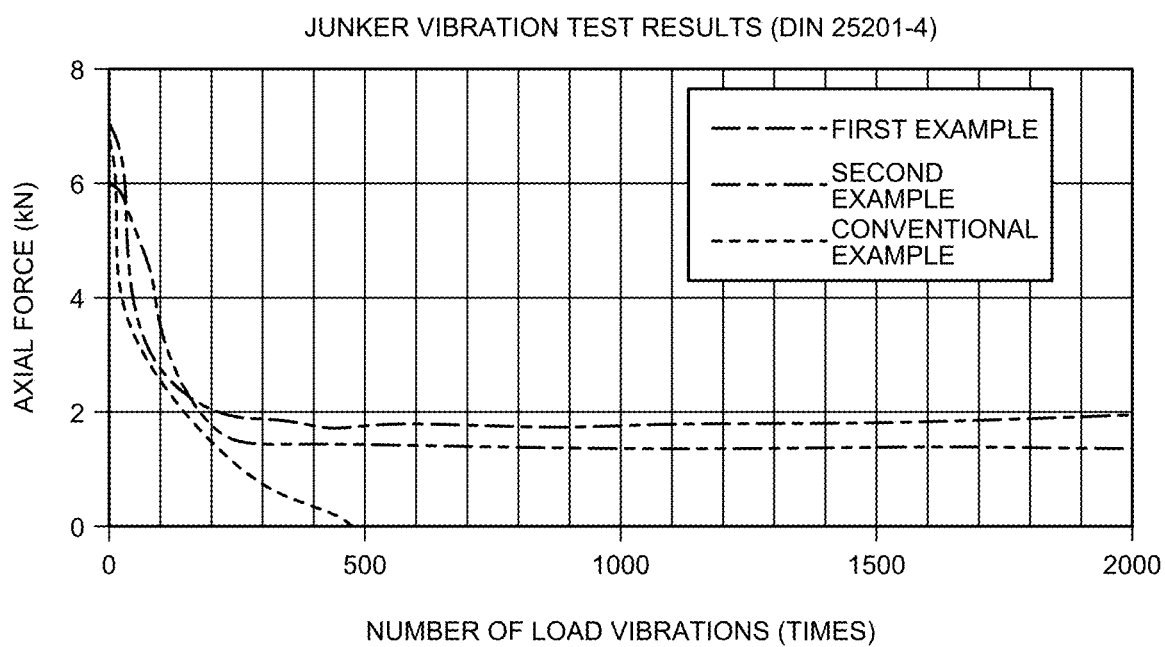
FIG. 8 is results of Junker vibration tests for the bolts according to the first and second examples.

FIG. 8 illustrates results of Junker vibration tests for the bolts according to the first and second examples. The Junker vibration tests were performed based on the screw loosening vibration test standard DIN 25201-4. As evident from FIG. 8, both of the bolts according to the first example and second example maintain their high axial force even when the number of load vibrations is increased, in contrast to the bolt according to the conventional example. Furthermore, the axial force of the bolt according to the conventional example is reduced as the number of load vibrations is increased, while the axial force is maintained constantly in the first and second examples. Accordingly, each of the bolts according to the first and second examples has thus been found to serve as the fastening member 1 that is highly reliable.

Second Embodiment

Figure 9:
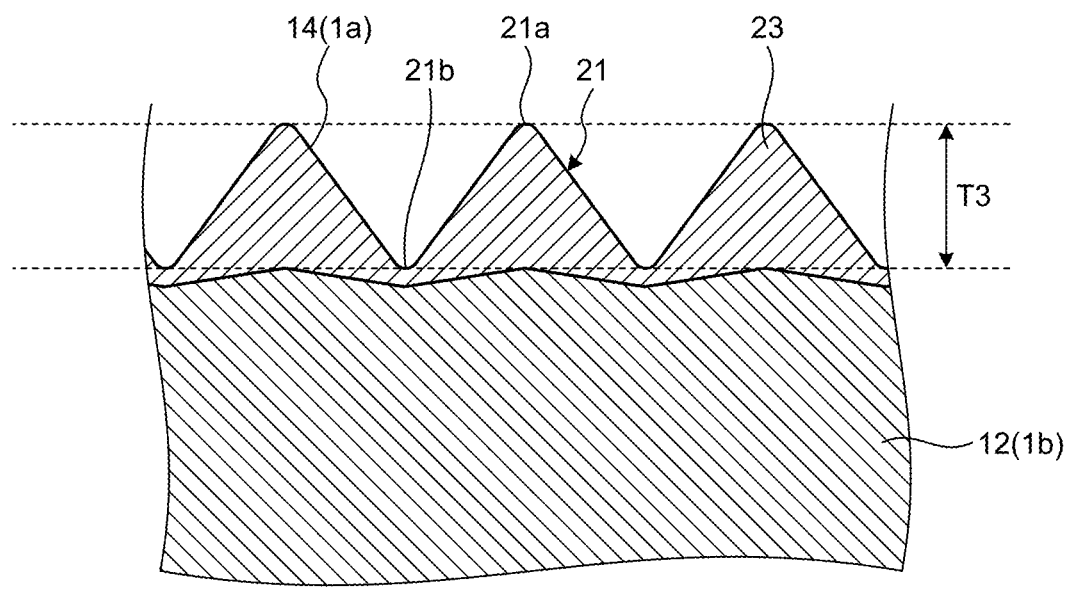
FIG. 9 is an enlarged view of a cross section including a central axis of a fastening member according to a second embodiment of the present invention.
Figure 10:
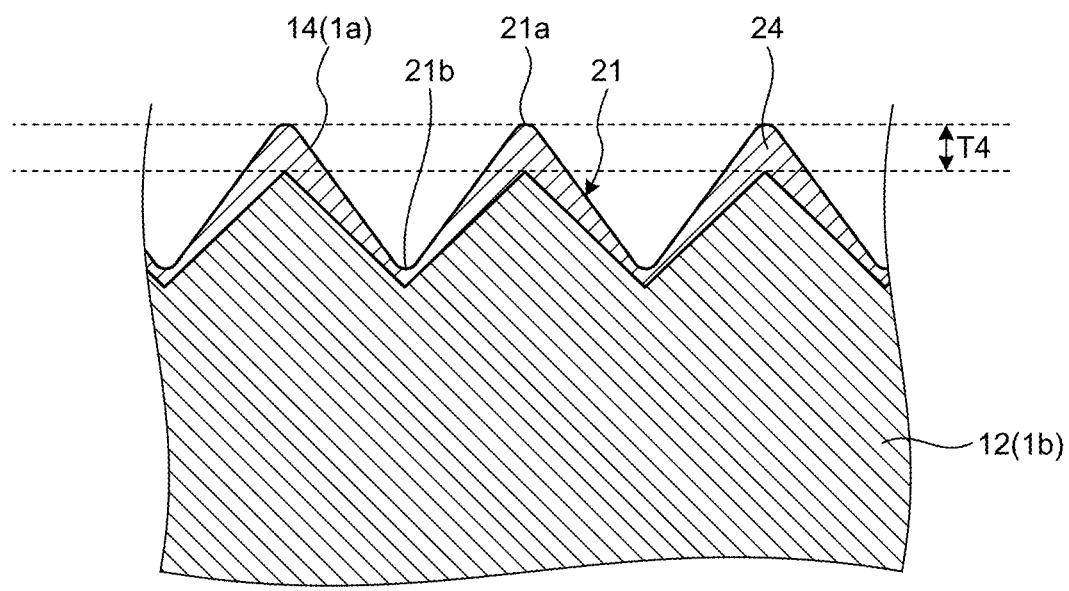
FIG. 10 is another enlarged view of the cross section including the central axis of the fastening member according to the second embodiment of the present invention.

Described hereinafter is a fastening member according to a second embodiment. Any portion serving as a component in common with the fastening member 1 according to the first embodiment will be assigned with the same reference sign, and description thereof will be omitted. As illustrated in FIG. 9 and FIG. 10, the outer periphery of the main body portion 12 is convex correspondingly to the screw threads 21. Furthermore, the root side of the outer peripheral portion 14 is concave correspondingly to the convexness of the outer periphery of the main body portion 12. That is, a part of the outer periphery of the main body portion 12 has flown into the screw threads 21.

FIG. 9 is an enlarged view of a maximum thickness portion. As illustrated in FIG. 9, at least the crest portions 21a of the screw threads 21 in the screw portion 22 are formed of the outer per portion 14. That is, the crest portions 21a of the screw threads 21 are formed of the first alloy material 1a. A thickness of the first alloy material 1a in the maximum thickness portion has a maximum thickness T3 in at least the screw threads 21 including the crest portions 21a. The thickness of the first alloy material 1a according to the second embodiment is a distance between a convex crest portion of the main body portion 12 and a crest portion of the screw threads 21.

The screw threads 21 are formed of the main body portion 12, at the root side thereof. That is, since there are convex portions at the outer periphery of the main body portion, a part of the screw threads 21 at the root side is formed of the second alloy material 1b and the other part thereof is formed of the first alloy material 1a. The root portions 21b of the screw portion 22 are also formed of the outer peripheral portion 14, and the main body portion 12 is not exposed thereat. That is, the root portions 21b are formed of the first alloy material 1a.

FIG. 10 is an enlarged view of a minimum thickness portion. The minimum thickness portion is formed opposite to the maximum thickness portion across the central axis of the shaft portion 2 (in a portion opposite thereto by about 180 degrees), in the same screw threads 21. As illustrated in FIG. 10, at least the crest portions 21a of the screw threads 21 in the minimum thickness portion are formed of the outer peripheral portion 14. That is, the crest portions 21a of the screw threads 21 in this portion are formed of the first alloy material 1a. Furthermore, the outer periphery of the main body portion 12 has flown more deeply into the screw threads 21, and the height of the convex shape of the outer periphery of the main body portion 12 is higher than that in the maximum thickness portion. Therefore, a thickness of the first alloy material 1a in the minimum thickness portion has a minimum thickness T4 (<T3) at least in the screw threads 21 including their crest portions 21a.

The screw threads 21 are formed of the main body portion 12, at the root side thereof. That is, the screw threads 21 are formed of the second alloy material 1b, at the root side. The root portions 21b of the screw portion 22 are also formed of the outer peripheral portion 14, and the main body portion 12 is not exposed thereat. That the root portions 21b are formed of the first alloy material 1a.

As described above, in the screw portion 22 of the fastening member 1, the outer peripheral portion 14 formed of the first alloy material 1a has, in a single screw thread 21, the maximum thickness T3 and the minimum thickness T2. That is, the outer peripheral portion 14 formed of the first alloy material 1a has: the thick portion 23 that is eccentric radially outward with respect to the main body portion 12 in a single screw thread 21; and the thin portion 24.

The maximum thickness portion (the thick portion 23) that the outer peripheral portion 14 has is not limited to a single location, and may be plurally provided in a single screw thread 21. Furthermore, both the maximum thickness portion (the thick portion 23) and the minimum thickness portion (the thin portion 24) that the outer peripheral portion 14 has do not need to be provided in all of the screw threads 21 in the screw portion 22, and may be provided only in a part of the screw threads 21.

Third Embodiment

Figure 11:
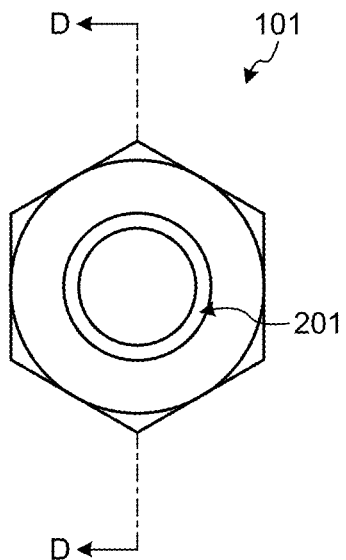
FIG. 11 is a plan view illustrating a configuration of a fastening member according to a third embodiment of the present invention.
Figure 12:
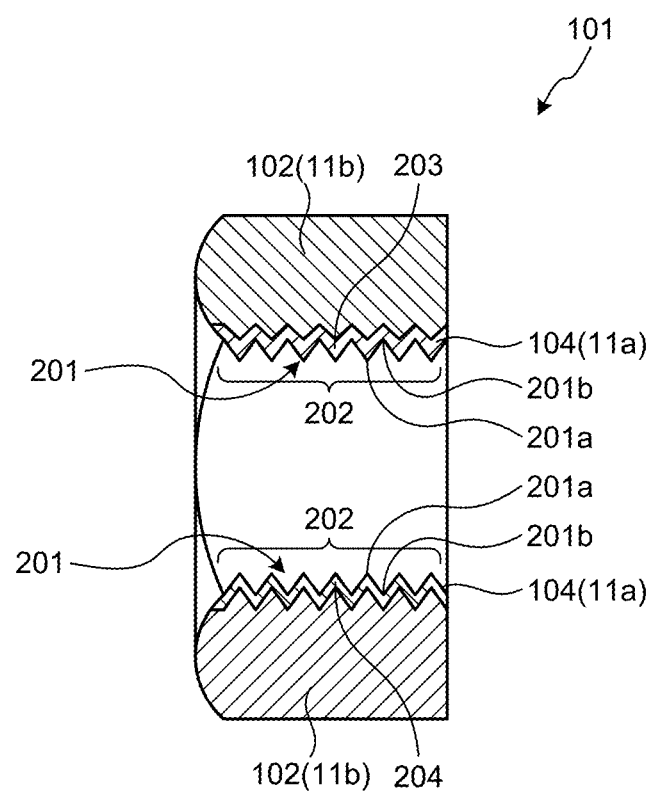
FIG. 12 is a sectional view along a D-D line in FIG. 11.

Described hereinafter is a fastening member according to a third embodiment. Any portion in common with the fastening member 1 according to the first embodiment or second embodiment will be assigned with the same reference sign, and description thereof will be omitted. FIG. 11 is a plan view illustrating a configuration of the fastening member according to the third embodiment of the present invention. FIG. 12 is a sectional view along a D-D line in FIG. 11. A fastening member 101 is a nut (one type of female screws) having a hollow cylindrical shape, and having screw threads 201 formed on an inner surface in a hole formed in a central portion thereof. The fastening member 101 has a screw portion 202 provided on an inner peripheral surface thereof, the screw portion 202 forming the plural screw threads 201. The shape of the fastening member 101 is not limited to a hexagonal nut shape, and may be any other shape, like that of a flanged nut or a cap nut.

The fastening member 101 is formed of a first alloy material 11a and a second alloy material 11b that are two types of alloys different from each other. The first alloy material 11a forms an inner peripheral portion 104 that covers a surface of the screw threads 201. The second alloy material 11b forms a main body portion 102 that is an outer peripheral portion of the fastening member. For example, the first alloy material 11a is the same material as the first alloy material 1a, and the second alloy material 11b is the same material as the second alloy material 1b.

The main body portion 102 is present at an outer peripheral side of the fastening member 101, and the inner peripheral portion, 104 covers the inner surface in the hole formed in the central portion thereof. Both crest portions 201a and root portions 201b in the screw portion 202 are covered by the inner peripheral portion 104, and the main body portion 102 (the second alloy material 11b) is not exposed thereat. The inner peripheral portion 104 does not need to cover the main body portion 102 completely.

The inner peripheral portion 104 (the first alloy material 11a) differs in thickness at positions along a circumferential direction of the hole formed in the central portion. The inner peripheral portion 104 has, in the same screw thread 201 including a crest portion 201a of the screw thread 201, a maximum thickness portion (a thick portion 203), and a minimum thickness portion (a thin portion 204) formed in a region opposite thereto about a central axis of the hole formed in the central portion thereof (in a portion opposite thereto by about 180 degrees). That is, a circumferential direction part of the inner peripheral portion 104 covers a surface of the main body portion 102 in a state of being eccentric radially inward with respect to the main body portion 102.

Embodiments of the present invention have been described thus far, but the present invention is not limited to these embodiments, and may be implemented in various modes, without departing from the gist of the present invention. For example, the fastening member may be a male screw other than a bolt, such as a machine screw or a tapping screw.

The present invention may thus include various embodiments and the like not described herein, and various design changes and the like may be made without departing from the technical ideas determined by the claims.

INDUSTRIAL APPLICABILITY

As described above, a fastening member according to the present invention is suitable for: realization of reduction in weight of the fastening member; reduction of occurrence of loosening; and improvement of reliability and durability of a fastening structure of the fastening member.

REFERENCE SIGNS LIST 1, 101 FASTENING MEMBER
1a, 11a FIRST ALLOY MATERIAL
1b, 11b SECOND ALLOY MATERIAL
12, 102 MAIN BODY PORTION
14 OUTER PERIPHERAL PORTION
104 INNER PERIPHERAL PORTION
2 SHAFT PORTION
3 HEAD PORTION
21, 201 SCREW THREAD
21a, 201a CREST PORTION
21b, 201b ROOT PORTION
22, 202 SCREW PORTION
23, 203 THICK PORTION
24, 204 THIN PORTION

The invention claimed is:

1. A fastening member comprising:
a head portion; and
a shaft portion including a screw thread formed therein, wherein
the shaft portion includes a main body portion, and an outer peripheral portion provided radially outside the main body portion,
the outer peripheral portion in the screw thread is formed of a first alloy material, and forms a portion including at least a crest portion of the screw thread,
the main body portion in the screw thread is formed of a second alloy material having a tensile strength higher than that of the first alloy material, and forms a portion including a root of the screw thread, and
the outer peripheral portion in the screw thread includes: a thick portion where the outer peripheral portion is maximized in thickness in a circumferential direction of the shaft portion; and a thin portion where the outer peripheral portion is minimized in thickness in the circumferential direction of the shaft portion,
wherein the outer peripheral portion is eccentric with respect to the main body portion.

2. The fastening member according to claim 1, wherein the thick portion and the thin portion are opposite to each other across a central axis of the shaft portion.

3. The fastening member according to claim 1, wherein
one or more of the screw threads are formed in a screw portion formed in an axial direction intermediate portion of the shaft portion,
the screw thread extends one round about an axis of the shaft portion, and
the thick portion and the thin portion are formed at least one each in the one round of the screw thread in the screw portion.

4. The fastening member according to claim 1, wherein the first alloy material is a 1000 series or 6000 series aluminum-based alloy according to the Japanese Industrial Standards, and the second alloy material is a 2000 series or 7000 series aluminum-based alloy according to the Japanese Industrial Standards.

5. A fastening member comprising:
a screw thread formed therein;
a main body portion; and
an inner peripheral portion provided radially inside the main body portion, wherein
the inner peripheral portion in the screw thread is formed of a first alloy material, and forms a portion including at least a crest portion of the screw thread,
the main body portion in the screw thread is formed of a second alloy material having a tensile strength higher than that of the first alloy material, and forms a part including a root of the screw thread, and
the inner peripheral portion in the screw thread includes: a thick portion where the inner peripheral portion is maximized in thickness in a circumferential direction; and a thin portion where the inner peripheral portion is minimized in thickness in the circumferential direction,
wherein the inner peripheral portion is eccentric with respect to the main body portion.

* * * * *